United States Patent [19]

Lawton

[11] Patent Number: 5,533,275
[45] Date of Patent: Jul. 9, 1996

[54] METHOD AND APPARATUS FOR CONTROLLING THE TEMPERATURE OF CARGO WITHIN A CONTAINER

[75] Inventor: Arthur R. Lawton, Cambridge, United Kingdom

[73] Assignee: Synectic Technology, Inc., Littleton, Colo.

[21] Appl. No.: 322,105

[22] Filed: Oct. 12, 1994

[30] Foreign Application Priority Data

Oct. 13, 1993 [GB] United Kingdom .................... 9321090

[51] Int. Cl.$^6$ .................... F26B 7/00; B60H 1/32
[52] U.S. Cl. .................... 34/433; 62/239
[58] Field of Search .................... 34/428, 433, 62; 62/239

[56] References Cited

U.S. PATENT DOCUMENTS

| | | | |
|---|---|---|---|
| 1,251,476 | 1/1918 | Clinton | 34/433 |
| 3,246,592 | 4/1966 | Rath | 62/239 X |
| 3,303,659 | 2/1967 | Fritch | 62/239 X |
| 3,421,340 | 1/1969 | Berg | 62/239 |
| 3,733,849 | 5/1973 | Cantagallo et al. | 62/239 X |
| 3,738,511 | 6/1973 | Lemon et al. | 62/239 X |
| 4,565,071 | 1/1986 | Bartling et al. | 62/405 X |
| 5,319,941 | 6/1994 | Schilling | 62/239 X |

FOREIGN PATENT DOCUMENTS

| | | | |
|---|---|---|---|
| 0134341 | 2/1979 | Germany | 62/239 |
| 2-130374 | 5/1990 | Japan | 62/239 |

OTHER PUBLICATIONS

Design and performance of insulated and refrigerated ISO intermodal containers. R. D. Heap, Shipowners Refrigerated Cargo Research Association, Cambridge, U.K., 1989 Butterworth & Co., (Publishers) Ltd.

*Primary Examiner*—Hoang Nguyen
*Attorney, Agent, or Firm*—Dorr, Carson, Sloan & Birney

[57] ABSTRACT

A method and apparatus for controlling the temperatures of cargo in a container, wherein cooling air is circulated over and beneath the cargo, then between the cargo and the door(s) of the container, for subsequent passage towards the front of the container over the top of the cargo, wherein the cooling air at the rear of the container is separated into two streams by an air separator board having a first limb which is located over the top of the cargo, and a second limb extending approximately at right angles to the first limb so that the internal stream at the rear of the container is separated from the external stream which is subjected to warming from ambient air around the container. The invention also extends to an air separator board per se, which is L-shaped, and preferably made of wood and has ribs on its internal and external faces.

9 Claims, 1 Drawing Sheet

METHOD AND APPARATUS FOR CONTROLLING THE TEMPERATURE OF CARGO WITHIN A CONTAINER

This invention relates to a method of controlling the temperature of cargo within a container, and to an air separator device for assisting in controlling the temperature of refrigerated cargo, especially in an ISO transport container, truck or trailer.

Certain cargoes, such as chilled meat and certain fruit require extremely tight temperature control to maintain low bacteriological counts and to ensure there is no insect infestation.

Traditionally, such cargo is transported in large ISO containers, trucks or trailers or the like (hereinafter called containers) which are filled from their rear ends, through full width/height double doors. The containers have a means of refrigeration at their front end, insulated walls and roof. The refrigerated air is directed from the front end, under the cargo, which is supported on a slatted floor formed from spaced generally T-shaped slats, and is then allowed to flow up the rear of the cargo, in front of the rear doors, and back over the cargo, and beneath the roof of the container, whereupon it is refrigerated again, and recirculated. Because it is difficult to ensure a good seal at the rear doors, and because it is usual to leave a space above the cargo at the rear of the container, the stream of cooling air, as it passes this area, is liable to warming from ambient air around the container, due to heat transfer from the rear door and rear roof and wall areas of the container, and this warmed air will thus tend to warm the cargo in downstream areas within the container, e.g. that part of the cargo towards the front, and at the top of the container.

The present invention seeks to overcome this problem and reduce the amount by which the cargo is warmed.

According to one aspect of the present invention, we provide a method of controlling the temperatures of cargo in a container, wherein cooling air is circulated over the cargo, the air being directed beneath the cargo, then between the cargo and a rear door or doors of the container, for subsequent passage towards the front of the container over the top of the cargo, wherein the cooling air at the rear of the container is separated into two streams by an air separator board having a first limb which is located over the top of the cargo, and a second limb extending approximately at right angles to the first limb so that the internal stream at the rear of the container is separated from the external stream which is subjected to warming from ambient air around the container.

According to a second aspect of the invention, we provide an air separator board for controlling the temperature of cargo within a container, the air separator board being sized to fit within the container and having a first limb which locates over the top of the Cargo at the rear of the container, and a second limb extending generally at right angles to the first limb.

Preferably, the air separator board is L-shaped, and its second limb extends across the rear of the container, between the cargo and the rear container door(s) to separate air contacting the rear container doors from air in contact with the cargo, thereby minimising warming of air contacting the cargo at the rear of the container.

Preferably, the air separator board is made of wood, but it could be made of any other sheet material exhibiting insulating properties, such as card, plastics material, polystyrene or other board material.

Preferably the board has ribs on its internal and external faces, those on the internal face preferably being arranged generally in the form of a fan, to direct air over and around the cargo, and those on the external face being generally parallel and extending vertically.

The board may be formed of two sheets measuring approximately 6 mm×2500 mm×2500 mm connected together along respective edges and the ribs may be formed of battens which are rectangular with dimensions ranging from approx. 5 mm to 100 mm.

If desired, additional separator boards may be provided along the sides of the container, connected to the L-shaped board, to separate air contacting the side walls from the adjacent air.

The thinking behind the invention is that heat ingresses through the insulation of the container walls and doors and through the door seals and needs to be removed by the circulatory cooling air from the cooling system. The problem is that while this heat is being removed the air stream is warming, which warms the cargo further up the insulated compartment within the container. However, if the airflow is split, the stream flowing up the inner side of the cargo walls removes the ingress of heat, while the stream flowing up the cargo maintains the correct temperature. Little heat flows through the separator board because the difference in temperature between the two air streams is relatively small.

The battens arranged in a fan shape are to direct the coolest air of the inner air stream to the cargo with warmer air of the outer air stream being directed to cool the inner insulated surface of the container.

In experimental work we have found that with a simulated cargo in a 5 year old 20' refrigerated container in an ambient temperature of 40° C. with a delivery air temperature of −1.2° C., the average temperature of cargo at the door end of the container was reduced from 0.4° C. to −0.4° C. by using the invention.

The invention is now described by way of example with reference to the accompanying partly schematic drawings, in which.

Figure 1:
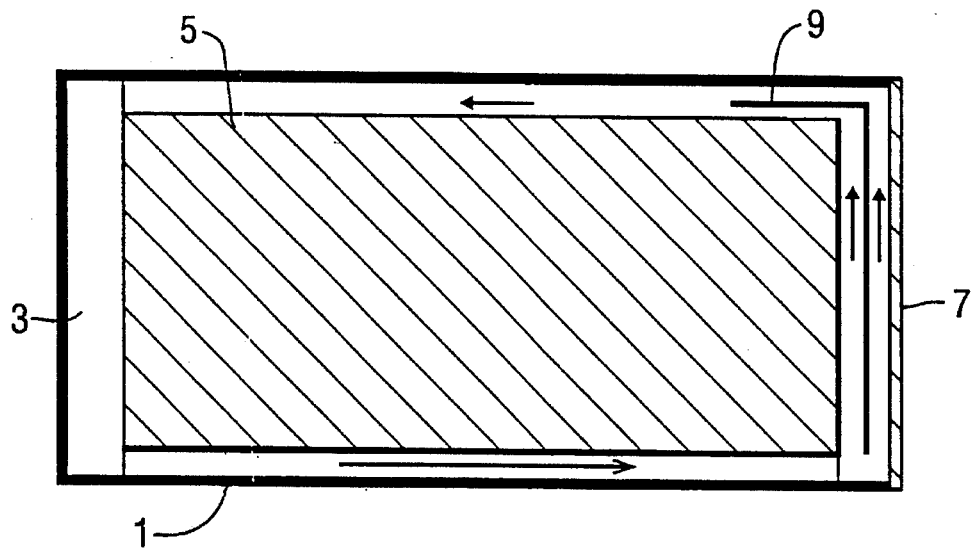
FIG. 1 is a longitudinal section through an ISO container filled with cargo and having an air separator board therein.

Referring to the drawings, the ISO container has an air refrigeration unit 3 at its front end, and cooled air from this is directed beneath cargo 5 within the container, the floor of the container being formed in known manner from a plurality of closely spaced T-shaped ribs, girders or slats. Although some of this cold air will pass between the gaps in the floor and infiltrate the cargo to keep at least the lower part thereof cool, a proportion of the air will pass beneath the floor, and thus flow up between the rear of the container, and the cargo 5.

Almost always, the rear of the container is closed off by two doors 7 spanning the whole width and whole height of the container, and maximum heat gain within the container usually occurs at this location; to stop air warmed by passage over the inner surface of the doors 7 from transferring its gained heat to the cargo 7, a generally L-shaped air separator board 9 is stowed within the container, between the cargo and the rear doors 7, and over the rear portion of cargo, which traditionally is only stacked to a predetermined height, short of the roof of the container. Thus, as the cooling air moves from under the floor at the rear of the container 1, it is separated into two streams, a first of which contacts the cargo to keep it cool, and the other of which passes over the interior of the doors 7 and the interior of the container roof, at its rear. Even if this other air stream is warmed slightly, as a result of ambient air being warmer than it is, and heat ingressing through or around the doors 7, it will remain separated from the first air stream by the board 9. Because there is only a small temperature difference between the two air streams and the board 9 does not easily transmit heat, the first air stream will not be warmed up and will still satisfactorily cool the cargo 5 at the rear of the container.

Figure 2:
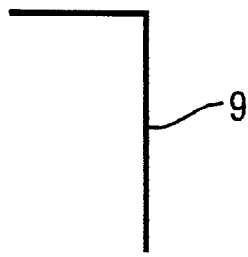
FIG. 2 is a side elevation of another air separator board.
Figure 3:
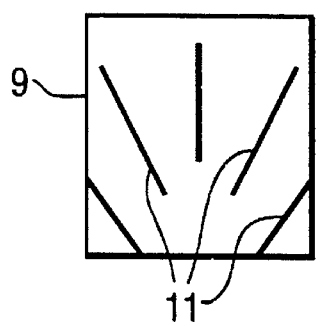
FIG. 3 shows the arrangement of ribs on the interior surfaces of this board.
Figure 4:
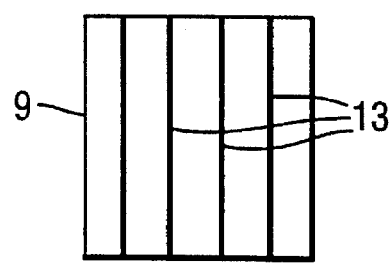
FIG. 4 shows the arrangement of ribs on the outer surfaces of the board.

The separator board 9 is preferably L-shaped and each arm of the L preferably measures 2500 mm×2500 mm×6 mm thick, as shown in FIGS. 2–4. On its inner face, each board has a plurality of projecting ribs 11, arranged in the form of a fan, to distribute the first air stream over the surface of the cargo 5, and on its outer face, further parallel spaced ribs 13 are provided, which channel the other air stream across the door 7, and then along the roof of the rear of the container. The battens are preferably of rectangular cross section with dimensions from about 5 mm to about 100 mm wide;

It is envisaged that further air separator boards may be connected to the L-shaped board at the rear of the container along the side walls of the container.

The present invention could be used for all temperature sensitive cargoes transported under temperature control with circulated air, e.g. chilled meat, fresh fruit and vegetables, and for cold sterilisation applications for USDA/Japan or other cold treatment quarantine conditions.

It will of course be understood that the present invention has been described above purely by way of example, and modifications of detail can be made within the scope of the invention.

What is claimed is:

1. A method of controlling the temperatures of cargo in a container, wherein cooling air is circulated over the cargo, comprising the steps of directing cooling air beneath the cargo, then directing at least a portion of the cooling air between the cargo and a rear door or doors of the container, and then directing the portion of cooling air towards the front of the container over the top of the cargo, wherein the step of directing the portion of cooling air between the cargo and the rear door or doors at the rear of the container comprises separating the portion of cooling air into two streams by a removable air separator board having a first limb which is located over the top of the cargo, and a second limb extending approximately at right angles to the first limb and extending over substantially all of the area of the rear door or doors so that an internal stream flows between the cargo and the separator board and is separated from an external stream which flows between the separator board and the rear door or doors which is subjected to warming from ambient air around the container.

2. A readily removable air separator board for controlling the temperature of cargo within a container having a rear door, the air separator board being sized to fit within the container and comprising a first limb which locates over the top of the cargo at the rear of the container, and a second limb extending generally at right angles to the first limb which locates between the cargo and the rear door and extends over substantially all of the area of the rear door, for dividing an air flow originating beneath the cargo into an internal stream flowing upwardly between the cargo and the separator board and an external stream flowing upwardly between the separator board and the rear door.

3. The invention according to claim 2 wherein the air separator board is L-shaped, and its second limb extends across the rear of the container, between the cargo and the rear container door(s) to separate air contacting the rear container doors from air in contact with the cargo, thereby minimizing warming of air contacting the cargo at the rear of the container.

4. The invention according to claim 2, wherein the air separator board is made of wood.

5. The invention according to claim 2, wherein the board has ribs on its internal and external faces.

6. The invention according to claim 5, wherein the ribs on the internal face are arranged generally in the form of a fan, to direct air over and around the cargo, and those on the external face are generally parallel and extending vertically.

7. The invention according to claim 2, wherein the first limb extends over substantially all of the width of the container.

8. The invention according to claim 2, wherein the air separator board further comprises a side board connected to the separator board which locates between the cargo and a side wall of the container for separating air contacting the side wall from air contacting the cargo.

9. The method according to claim 1, further comprising the step of preventing heat transfer from the external stream to the internal stream with the separator board.

* * * * *

UNITED STATES PATENT AND TRADEMARK OFFICE
CERTIFICATE OF CORRECTION

PATENT NO. : 5,533,275
DATED : July 9, 1996
INVENTOR(S) : Arthur R. Lawton

It is certified that error appears in the above-indentified patent and that said Letters Patent is hereby corrected as shown below:

On the cover page,

After Assignee: Replace "Synectic Technology, Inc., Littleton, Colo." with

-- Shipowners Refrigerated Cargo Research Association, London, U.K. --

After Attorney, Agent or Firm:
Replace "Dorr, Carson, Sloan and Birney" with
-- Cumpston & Shaw --.

Signed and Sealed this

Twelfth Day of November, 1996

Attest:

BRUCE LEHMAN

*Attesting Officer*     *Commissioner of Patents and Trademarks*